United States Patent
Di Pietro et al.

(10) Patent No.: US 11,350,472 B2
(45) Date of Patent: May 31, 2022

(54) MULTI-LINK NETWORK ACCESS METHOD

(71) Applicant: COMMISSARIAT A L'ENERGIE ATOMIQUE ET AUX ENERGIES ALTERNATIVES, Paris (FR)

(72) Inventors: Nicola Di Pietro, Grenoble (FR); Emilio Calvanese Strinati, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 325 days.

(21) Appl. No.: 16/802,630

(22) Filed: Feb. 27, 2020

(65) Prior Publication Data

US 2020/0281035 A1  Sep. 3, 2020

(30) Foreign Application Priority Data

Feb. 28, 2019 (FR) ...................... 19 02085

(51) Int. Cl.
  *H04W 76/15* (2018.01)
  *H04W 28/02* (2009.01)
  *H04W 24/10* (2009.01)
  *H04B 17/318* (2015.01)
  *H04L 5/00* (2006.01)

(52) U.S. Cl.
  CPC .......... *H04W 76/15* (2018.02); *H04B 17/318* (2015.01); *H04L 5/0055* (2013.01); *H04W 24/10* (2013.01); *H04W 28/0268* (2013.01)

(58) Field of Classification Search
  CPC . H04W 76/15; H04W 24/10; H04W 28/0268; H04W 72/087; H04W 72/02; H04B 17/318; H04L 5/0055
  See application file for complete search history.

(56) References Cited

U.S. PATENT DOCUMENTS

| 2016/0323900 | A1 | 11/2016 | De Domenico et al. |
| 2018/0124713 | A1* | 5/2018 | Mar ..................... H04W 72/087 |

FOREIGN PATENT DOCUMENTS

| EP | 1179961 A1 * | 2/2002 | ............ H04W 36/18 |
| EP | 1 798 874 A1 | 6/2007 | |
| EP | 1798874 A1 * | 6/2007 | ............ H04W 72/02 |

OTHER PUBLICATIONS

Enabling Effective mobile edge computing using millimeter wave links (Year: 2017).*
French Preliminary Search Report dated Nov. 13, 2019 in French Application 19 02085 filed on Feb. 28, 2019 (with English Translation of Categories of Cited Documents), 2 pages.
Barbarossa et al., "Enabling Effective Mobile Edge Computing Using Millimeter Wave Links", IEEE International Conference On Communications Workshops, 2017, 6 pages.

* cited by examiner

*Primary Examiner* — Charles C Jiang
*Assistant Examiner* — Voster Preval
(74) *Attorney, Agent, or Firm* — Oblon, McClelland, Maier & Neustadt, L.L.P.

(57) ABSTRACT

A method for a mobile terminal to access a network with a multi-link with a plurality of network access points. When the terminal wishes to obtain a quality of service expressed in the form of a minimum bitrate constraint on the uplink, it determines the identity and the number of access points with which it must establish a link to meet this constraint while minimizing its emission power. A MEC network with a mobile terminal that can request the network to support a computational task under latency constraint.

9 Claims, 3 Drawing Sheets

MULTI-LINK NETWORK ACCESS METHOD

TECHNICAL FIELD

The present invention essentially relates to the field of MEC (Mobile Edge Computing) networks, more particularly heterogeneous cellular networks (HetNets) of the 4G, 5G generation and beyond.

PRIOR ART

One of the essential features of the future 5G mobile telecommunications networks is the remote of computations to the edge of the network, called MEC (Mobile Edge Computing). This technique allows providing a mobile terminal with Cloud Computing capacities within the access network or RAN (Radio Access Network). A network providing this remote computing possibility (MEC network) has Radio Access Points or RAP that can quickly, locally or via the backhaul network, access significant computing, storage and cache resources. Thus, a mobile terminal will be able to offload the execution of some tasks (computation offloading) that consume computing resources, such as those involved in applications of augmented reality, distributed security, etc.

However, the remote of computations to the MEC network creates a considerable traffic load in the network, in particular on the uplink, since the terminal must then transmit the data to be processed to the access point with which it is associated. Furthermore, a large number of applications, particularly those which must be executed in real time, require a low computing latency (time interval separating the sending of the data and the reception of the computing result by the terminal). This results in severe constraints, most often punctual, on the minimum bitrate to be ensured on the uplink.

Another important feature of 5G networks is their heterogeneous nature. A heterogeneous network or HetNet is composed of several levels (tiers) of cells having different sizes: macrocells and small cells. While the Macrocell Base Stations (MBSs) provide continuous coverage to users as in a conventional cellular network, the Small cell Base Stations or SBSs allow locally providing high bitrates. The SBSs base stations further provide multi-technology or multi-RAT (multi-Radio Access Technology) access in the sense that a mobile terminal can be associated with an SBS either in a conventional sub-6 GHz band, (as for an MBS), or in the millimetre band.

To increase its bitrate on the uplink and reduce the computing latency, a mobile terminal can connect simultaneously to several SBSs in the millimetre band by forming beams in several directions. More specifically, the data packets to be transmitted are divided into sub-packets which are transmitted via separate beams. The different sub-packets are then concatenated by the network (for example one of the SBS stations) before being transmitted to the computing server.

FIG. 1 schematically represents a multi-link to a MEC network according to an access method known from the state of the art. The mobile terminal UE is provided with a plurality of emitting antennas (antenna network of a MIMO system) and generates a plurality of beams (here B1, B2) pointing in directions where there are several radio access points (here, the base stations SBS1 and SBS2). The base stations SBS1 and SBS2 are here linked by the backhaul network but they can alternatively be linked by means of a hop network. The sub-packets transmitted via the beams B1 and B2 are concatenated by the master base station SBS1 and the resulting packet is transmitted via the backhaul network to a computing server (or datacenter), DC.

Such a strategy of simultaneous access to several SBS stations of a MEC network was proposed in the article by S. Barbarossa and al. entitled "Enabling effective mobile edge computing using millimetre wave links", Proc. of IEEE International Conference on Communications Workshops (ICC Workshops), May 21-25, 2017, pp. 1-6. The strategy presented there aims at minimising the power consumed by the mobile terminal while verifying a computing latency constraint.

However, the aforementioned article only provides a statistical approach taking into account the probabilities of blocking links with the various access points. In particular, it does not provide a practical rule allowing the number and identity of access points to be selected to establish a multi-link with the MEC network, when a minimum bitrate constraint must be observed on the uplink.

Consequently, the purpose of the present invention is to propose a method for accessing a network, in particular a MEC network, allowing to practically select the number and the identity of the access points with which a mobile terminal must establish a multi-link, so as to minimise its power consumption while observing a service quality constraint expressed in terms of minimum bitrate on the uplink.

PRESENTATION OF THE INVENTION

The present invention is defined by a method for a user terminal to access a network comprising a plurality of access points, said terminal being able to establish a multi-link on the uplink with a plurality N of such access points by means of a same plurality of transmission channels, wherein, when the terminal wishes to obtain a quality of service expressed in the form of a minimum bitrate, $R_{min}$, on the uplink, this terminal:

obtains a channel quality indicator, $a_i$, for each transmission channel $L_i$ of said plurality, the transmission channels being indexed by decreasing quality level from their respective quality indicators;

determines an optimal number of transmission channels, for transmitting said minimum bitrate, said optimal number being obtained as the smallest integer $N^* \leq N$ satisfying $R_{min}/B \leq \rho - N^* \log_2(a_{N^*+1})$, where $$\rho = \sum_{j=1}^{N^*} \log_2(a_j)$$

and selects the transmission channels $L_1, \ldots, L_{N^*}$ corresponding to this optimal number;

for each of the transmission channels selected in the previous step, $L_i$, $i=1, \ldots, N^*$, determines a bitrate, $R_i$, by means of $\overline{R} + B \log_2(a_i)$ with $$\overline{R} = \frac{1}{N^*}(R_{min} - B\rho)$$

and deduces a minimum power, capable of delivering the bitrate $R_i$ on this channel;

when the sum of the minimum powers on the different channels is less than a predetermined maximum power, transmits binary data in parallel by distributing them on the different transmission channels selected $L_1, \ldots, L_{N^*}$ respectively with the bitrates $R_i$, and the powers $p_i$, $i=1, \ldots, N^*$, previously determined.

According to a first embodiment, the quality indicators of the transmission channels $L_i$, i=1, ..., N, are obtained by $$a_i = \frac{|h_i|^2}{\sigma_{n,i}^2}$$

where $|h_i|^2$ is the highest eigenvalue of $H_iH_i^H$, where $H_i$ the matrix of the transmission channel $L_i$ and $\sigma_{n,i}^2$ is the noise power affecting the channel $L_i$.

According to a second exemplary embodiment, the quality indicators of the transmission channels $L_i$, i=1, ..., N, are obtained by $$a_i = \frac{a}{\sigma_{n,i}^2}\left(\frac{d_i}{d_{ref}}\right)^{-\alpha}$$

where $d_i$ is the distance separating the terminal from the access point on the transmission channel $L_i$, $\sigma_{n,i}^2$ is the noise power affecting the channel $L_i$, $d_{ref}$ is a reference distance, $\alpha$ is a positive real number depending on the type of environment of the access point and a is a positive coefficient.

In all cases, the quality indicators of the transmission channels can be weighted beforehand by the respective outage probabilities of these channels.

According to a third exemplary embodiment, the terminal measures the power levels of the signals received from the access points of said plurality and transmits them to the network, and the network determines, from these power levels, the quality indicators of the transmission channels $L_i$, i=1, ..., N, between the terminal and the various access points.

In a typical application case, the network can be a MEC network including a computing server and the terminal broadcasts to the network a request to execute a computational task with a maximum computing latency time $T_c$. The minimum bitrate, $R_{min}$, on the uplink is then determined by $$R_{min} = \frac{n_b}{(T_c - D_{rx} - w/f_s)}$$

where $n_b$ is the number of bits to be transmitted by the terminal on the uplink for the execution of the computational task, w is the number of computing cycles required for the execution of the task, $f_s$ is the computing power of said server and $D_{rx}$ is the time necessary to transmit the result of the computational task to the terminal on the downlink In one variant, only the access points that can support said execution request send an acknowledgement message to the terminal, said plurality N of access points then being constituted by those whose acknowledgement messages have been received by the terminal.

The terminal then distributes the packet of $n_b$ bits to be transmitted on the uplink on each of the transmission channels $L_i$, i=1, ..., N*, each transmission channel $L_i$ transmitting in parallel a sub-packet of a size $$n_i = n_b \cdot \frac{R_i}{R_{min}}.$$

In a typical application case, the network is a heterogeneous network comprising macrocells and small cells, that the access points are base stations of said small cells operating in the millimetre band.

BRIEF DESCRIPTION OF THE FIGURES

Other features and advantages of the invention will appear upon reading a preferred embodiment of the invention, described with reference to the attached figures among which.

DESCRIPTION OF THE EMBODIMENTS

Figure 1:
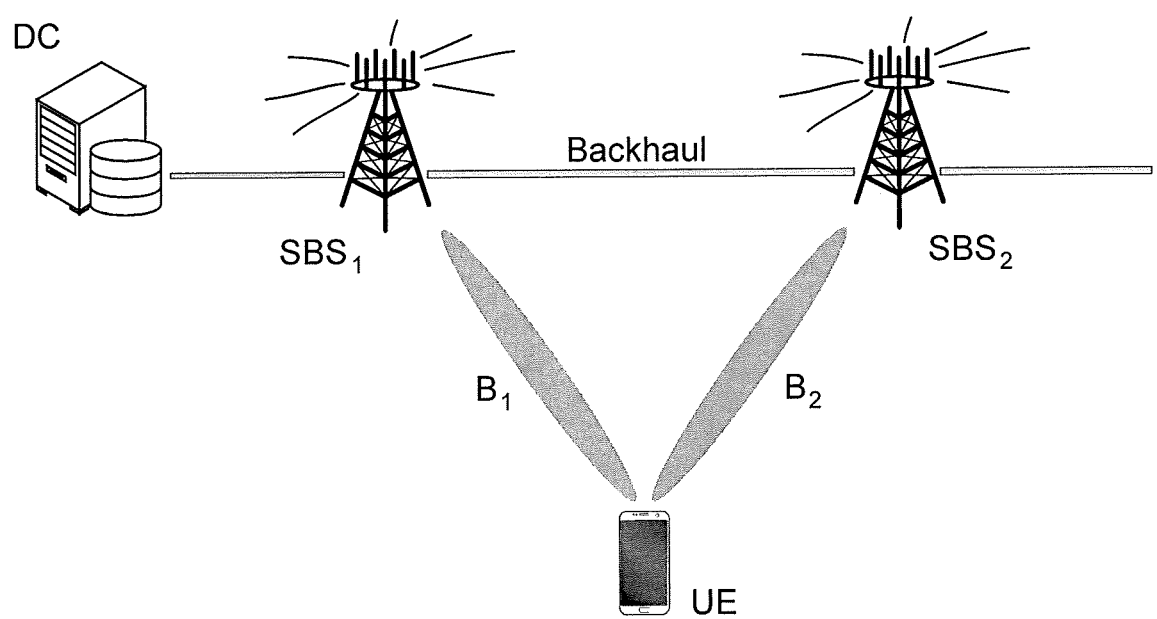
FIG. 1, already described, schematically represents a multi-link to a MEC network according to an access method known from the state of the art.

Hereinafter it will be assumed that a mobile terminal wishes to establish access with a network, in particular with a MEC network as described in the introductory part. The network comprises a plurality of access points by means of which the mobile terminal can establish a multi-link to the network. In a general manner, these access points can be macrocell base stations, relays, small cell base stations (femtocells, picocells etc.) and can use different access technologies. Without loss of generality, it will be assumed below that the access points (APs) are small cell stations SBSs operating in the millimetre range. Each access point is directly or indirectly connected to at least one computing and/or storage server that can perform a computing or retrieve the result of a previously performed computing. This server is advantageously located at the edge of the network, in the Radio Access Network or RAN.

The scenario considered in the context of the present invention is typically that of a mobile terminal application requiring a quality of service expressed in the form of a minimum bitrate, $R_{min}$, on the uplink. Such a situation is encountered, for example, when the terminal wishes to perform a task by the network (computation offloading) while respecting a computing latency.

More specifically, if we note $T_c$ the computing latency to be met, $n_b$ the number of bits that the mobile terminal must transfer to the MEC network to make it perform the task in question, w the number of CPU cycles to perform the task, $f_s$ the computing power (expressed in number of CPU cycles/s) of the server performing the task, and $D_{rx}$ the time necessary for the computing result to be returned by the server to the mobile terminal on the downlink, the bitrate on the uplink, R (in bits/s), must satisfy the constraint:

$$\frac{n_b}{R} + \frac{w}{f_s} + D_{rx} \leq T_c \quad (1)$$

in other words $R \geq R_{min}$ with $$R_{min} = \frac{n_b}{(T_c - D_{rx} - w/f_s)}.$$

When the link with the current access point does not have enough capacity to deliver the bitrate on the uplink, $R_{min}$, a first possibility is to increase the terminal emission power to obtain a higher signal to noise ratio and therefore greater channel capacity. Another possibility, which is not exclusive of the first one is to establish a second link with another network access point to transmit a fraction of the bitrate.

In a general manner, the mobile terminal wishing to observe a quality of service constraint expressed in the form of a minimum bitrate, $R_{min}$, which must be respected on the uplink, may involve a number N of links with surrounding access points while minimising the emission power on all of these links. If $L_i$, i=1, ..., N is noted, the transmission channels being able to be established between the mobile terminal UE and the different access points, and it is assumed that there is no interference between the beams received, the problem of optimisation means looking for the power distribution in the N beam directions, such that:

$$\text{the total transmission power} \sum_{i=1}^{N} Tr(Q_i) \text{ is minimum} \quad (2\text{-}1)$$

with the constraints:

$$\sum_{i=1}^{N} R(Q_i) \geq R_{min} \text{ where } R(Q_i) = B \log_2 \det\left(I_{N_R} + H_i Q_i H_i^H \Sigma_{n,i}^{-1}\right) \quad (2\text{-}2)$$

$$0 < \sum_{i=1}^{N} Tr(Q_i) \leq P_T^{max} \quad (2\text{-}3)$$

where $Q_i = (p_i/N_T) F_i F_i^H$ is the covariance matrix of the symbols emitted in the direction of the beam i, $p_i$ is the power with which the symbols are emitted on the transmission channel $L_i$, and $F_i$ is the precoding matrix (unit matrix of a size $N_T \times N_T$) allowing to generate the direction beam i, B is the bandwidth used for transmission, $R(Q_i)/B$ is the capacity of the transmission channel $L_i$, $I_{N_T}$ is the unit matrix of a size $N_T \times N_T$, $H_i$ is the matrix of a size $N_R \times N_T$ of the transmission channel $L_i$ where $N_T$ is the number of antennas of the terminal UE and $N_R$ is the number of antennas of each access point (the number of antennas is assumed to be identical regardless of the access point), $\Sigma_{n,i}$ is the noise covariance matrix on the transmission channel $L_i$ and $P_T^{max}$ is the maximum emission power of the mobile terminal in the band B.

The precoding matrix $F_i$ is selected equal to $V_i$ where $H_i = U_i D_i V_i^H$ is the decomposition into singular values of the channel matrix $H_i$ ($U_i$ and $V_i$ are unit matrices and $D_i$ is a diagonal matrix). In a dual manner, the access point (recipient of the transmission channel $L_i$) will form a beam in reception by multiplying the vector of the received signals by the matrix $U_i^H$.

Ultimately, the optimisation problem consists in performing a power allocation of the different beams so as to comply with the conditions (2-1), (2-2), (2-3), it being understood that a zero power corresponds to an unused beam. The number of used beams, in other words the number of access points involved in the multi-link, will be noted below N* (with N*≤N).

The expressions (2-1), (2-2), (2-3) are valid as long as the transmission channels between the mobile terminal and the different access points are not interfering. This condition will be fulfilled when the channels in question are of the single-path type and especially if these paths are in direct line (LOS). This condition is fulfilled, in the context previously mentioned, due to the strong directivity of the beams in the millimetre band. The channel matrices $H_i$ are then reduced to a complex scalar value, $h_i$, and the conditions (2-1), (2-2), (2-3) become respectively:

$$\text{minimization of the total transmission power } P_T = \sum_{i=1}^{N} p_i \quad (3\text{-}1)$$

with the constraints:

$$\sum_{i=1}^{N} R_i \geq R_{min} \text{ where } R_i = B \log_2\left(1 + \frac{|h_i|^2 p_i}{\sigma_{n,i}^2}\right) \quad (3\text{-}2)$$

$$0 < \sum_{i=1}^{N} p_i \leq P_T^{max} \quad (3\text{-}3)$$

In the following, it will be denoted $$a_i = \frac{|h_i|^2}{\sigma_{n,i}^2}$$

where $a_i$ is an indicator of the quality of the transmission channel $L_i$, since it represents the multiplying factor of the power $p_i$ in the signal to noise ratio. The indicator $a_i$ is homogeneous to the inverse of a power.

The access strategy will first be explained in the case of two access points, AP1 and AP2 with which the mobile terminal UE can establish links. It will be assumed that the channel $L_1$ is of better or of a same quality as the channel $L_2$, in other words that $a_1 \geq a_2$.

The emission powers $p_1$, $p_2$ necessary to deliver the bitrates $R_1$, $R_2$ are given by:

$$p_1 = \frac{2^{r_1} - 1}{a_1} \text{ and } p_2 = \frac{2^{r_1} - 1}{a_2} \quad (4)$$

where $r_1 = R_1/B$ and $r_2 = R_2/B$ are the information bitrates (in shannons/s) on the two transmission channels.

If the minimum bitrate $R_{min} = R_1 + R_2$ is simply transmitted and if $r_{min} = R_{min}/B$ denotes the minimum capacity of the composite transmission channel $L = L_1 \,\&\, L_2$ for delivering the bitrate, $R_{min}$, $r_1$, $r_2$ satisfy $r_1 + r_2 = r_{min}$ and the total power to be minimised is given by:

$$P_T = \frac{2^{r_1} - 1}{a_1} + \frac{2^{r_{min} - r_1} - 1}{a_2} = \left(\frac{2^{r_1}}{a_1} + \frac{2^{r_{min} - r_1}}{a_2}\right) - \left(\frac{a_1 + a_2}{a_1 a_2}\right) \quad (5)$$

The total power is minimum when the terms $$\frac{2^{r_1}}{a_1} \text{ and } \frac{2^{r_{min} - r_1}}{a_2}$$

are equal, in other words if:

$$R_1 = \frac{R_{min}}{2} + \frac{B}{2}\log_2\left(\frac{a_1}{a_2}\right) \quad (6\text{-}1)$$

$$R_2 = \frac{R_{min}}{2} + \frac{B}{2}\log_2\left(\frac{a_2}{a_1}\right) \quad (6\text{-}2)$$

It will be noted that these bitrates are both only defined if $$2^{R_{min}/B} \geq \max\left(\frac{a_1}{a_2}, \frac{a_2}{a_1}\right) = \frac{a_1}{a_2}.$$

In this case, the respective powers to be transmitted on the two transmission channels $L_1$, $L_2$ are given by:

$$p_1 = \left(\frac{2^{r_1}-1}{a_1}\right) = \sqrt{\frac{2^{R_{min}/B}}{a_1 a_2}} - \frac{1}{a_1} \quad (7\text{-}1)$$

$$p_2 = \left(\frac{2^{r_2}-1}{a_2}\right) = \sqrt{\frac{2^{R_{min}/B}}{a_1 a_2}} - \frac{1}{a_2} \quad (7\text{-}2)$$

and therefore the total power:

$$P_T = 2\left(\frac{2^{R_{min}/B}}{a_1 a_2}\right)^{1/2} - \left(\frac{1}{a_1} + \frac{1}{a_2}\right) \quad (8)$$

The transmission can only take place if $P_T \leq P_T^{max}$.

Figure 2:
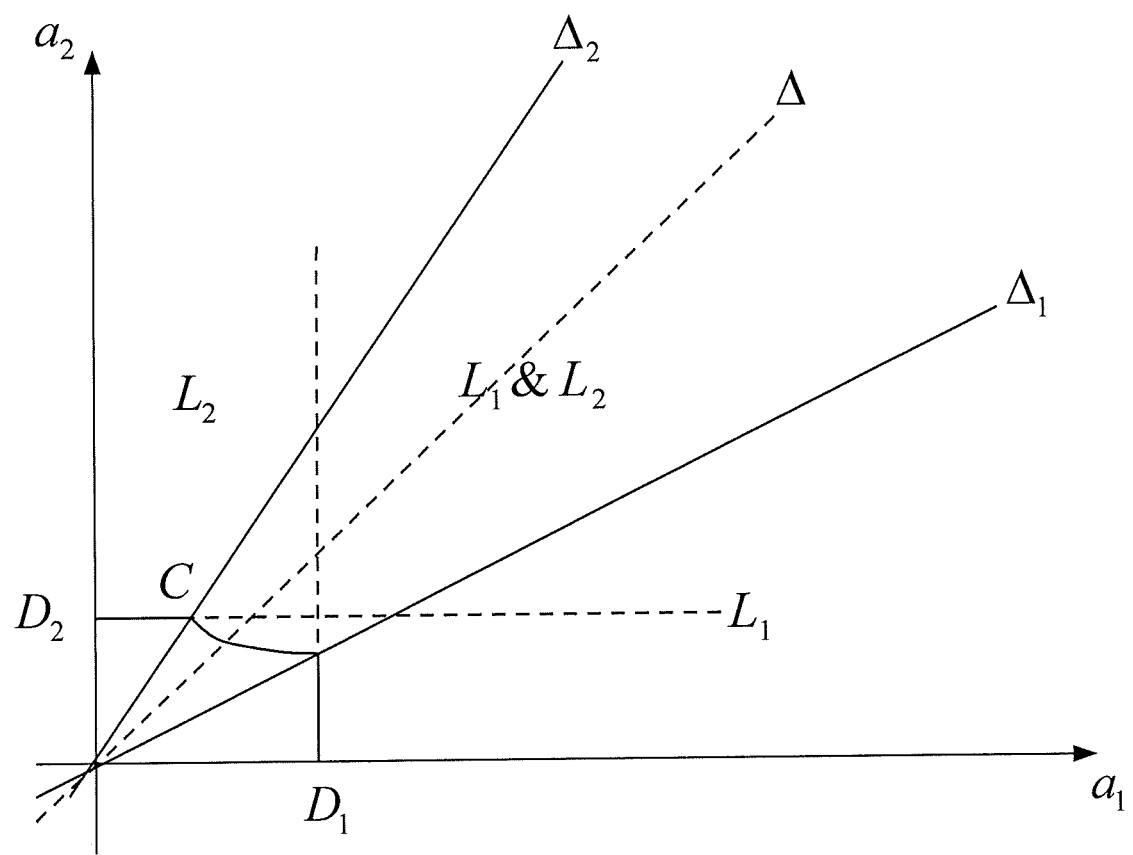
FIG. 2 graphically illustrates areas of choice of single link or dual link to a MEC network depending on the quality indicators of two transmission channels at two access points.

FIG. 2 graphically illustrates the strategy for accessing a MEC network based on the quality indicators $a_1$, $a_2$ of the two transmission channels $L_1$, $L_2$.

The channel $L_1$ quality indicator $a_1$ is shown on the abscissa and the channel $L_2$ quality indicator $a_2$ on the ordinate. The straight line $\Delta_1$ is of equation $a_2 = a_1 2^{-R_{min}/B}$ and the straight line $\Delta_2$ is of equation $a_2 = a_1 2^{R_{min}/B}$.

If the quality indicators are such that $a_2 \leq a_1 2^{-R_{min}/B}$ (area below the straight line $\Delta_1$ and including the latter) in other words if $$2^{R_{min}/B} \leq \frac{a_1}{a_2},$$

only the channel $L_1$ will be used. The channel quality indicator $L_1$ must however satisfy $$a_1 \geq \frac{2^{R_{min}/B} - 1}{P_T^{max}}$$

otherwise the bitrate $R_{min}$ cannot be delivered through this channel (area to the right of $D_1$), in accordance with the constraint (3-3).

Symmetrically, if the quality indicators are such that $a_2 \geq a_1 2^{R_{min}/B}$ (area above the straight line $\Delta_2$ and including the latter), in other words if $$2^{R_{min}/B} \leq \frac{a_2}{a_1},$$

only the channel $L_2$ will be used. The quality indicator of the channel $L_1$ will then have to satisfy $$a_2 \geq \frac{2^{R_{min}/B} - 1}{P_T^{max}}$$

otherwise the bitrate $R_{min}$ cannot be delivered through this channel (area above $D_2$), in accordance with the constraint (3-3).

When $$2^{R_{min}/B} > \frac{a_1}{a_2} \geq 1$$

(area comprised between the straight line $\Delta_1$ and the bisector $\Delta$) or else $$2^{R_{min}/B} > \frac{a_2}{a_1} \geq 1$$

(area comprised between the straight line $\Delta_2$ and the bisector $\Delta$) the two channels $L_1$ and $L_2$ are used, the transmission power on the channel $L_1$ being greater than that of the channel $L_2$ in the first case and lower in the second case. The quality indicators must further satisfy $$2\left(\frac{2^{R_{min}/B}}{a_1 a_2}\right)^{1/2} - \left(\frac{1}{a_1} + \frac{1}{a_2}\right) \leq P_T^{max},$$

otherwise the bitrate $R_{min}$ cannot be delivered through this composite channel (area beyond the curve C) in accordance with the constraint (3-3).

More generally, it can be shown that for a mobile terminal UE capable of establishing a multi-link on an uplink with a plurality N of access points, $SBS_i$, $i=1, \ldots, N$ with a same plurality of transmission channels $L_i$, $i=1, \ldots, N$, the transmission channels being indexed according to quality indicator decreasing values, in other words $a_1 \geq a_2 \geq \ldots \geq a_N$, if the following relationship is satisfied:

$$2^{R_{min}/B} > \frac{\prod_{i=1}^{N-1} a_i}{(a_N)^{N-1}} \quad (9)$$

the minimisation of the power emitted under bitrate $R_{min}$ constraint on the uplink will be performed by transmitting on each of the channels $L_i$ with the bitrate $R_i$ and the power $p_i$ defined by:

$$R_1 = \frac{1}{N}\left(R_{min} + B\log_2\left(\frac{(a_i)^N}{\prod_{j=1}^{N} a_j}\right)\right) \quad (10\text{-}1)$$

-continued $$p_1 = \frac{2^{R_i/B} - 1}{a_i} = \left(\frac{2^{R_{min}/B}}{\prod_{j=1}^{N} a_j}\right)^{1/N} - \frac{1}{a_i} \quad (10\text{-}2)$$

The total power emitted on the uplink is then:

$$P_T = N\left(\frac{2^{R_{min}/B}}{\prod_{j=1}^{N} a_j}\right)^{1/N} - \sum_{j=1}^{N} \frac{1}{a_j} \quad (11)$$

it being understood that the transmission can only take place if $P_T \leq P_T^{max}$.

The choice of the number of links to achieve the bitrate $R_{min}$ while minimising the emission power is made by looking for the smallest integer $N^* \leq N$ such that:

$$R_{min}/B \leq \rho - N^* \log_2(a_{N^*+1}) \quad (12)$$

where $$\rho = \sum_{j=1}^{N^*} \log_2(a_j),$$

with the convention $a_{N+1} = 0^+$ (such that relationship (12) is necessarily satisfied).

In other words, $N^* \leq N$ is the unique integer verifying:

$$\frac{\prod_{i=1}^{N^*-1} a_i}{(a_{N^*})^{N^*-1}} < 2^{R_{min}/B} \leq \frac{\prod_{i=1}^{N^*} a_i}{(a_{N^*+1})^{N^*}} \quad (13)$$

The N* best transmission channels having been selected, the allocation of the bitrate and emission power to these channels ($L_i$, i=1, ..., N*) is performed according to the principle of the expressions (10-1) and (10-2), that is to say:

$$R_i = \frac{1}{N^*}\left(R_{min} + B\log_2\left(\frac{(a_i)^{N^*}}{\prod_{j=1}^{N^*} a_j}\right)\right) = \overline{R} + B\log_2(a_i) \quad (14\text{-}1)$$

with $\overline{R} = \frac{1}{N^*}(R_{min} - B\rho)$, and:

$$p_i = \left(\frac{2^{R_{min}/B}}{\prod_{j=1}^{N^*} a_j}\right)^{1/N^*} - \frac{1}{a_i} \quad (14\text{-}2)$$

Figure 3:
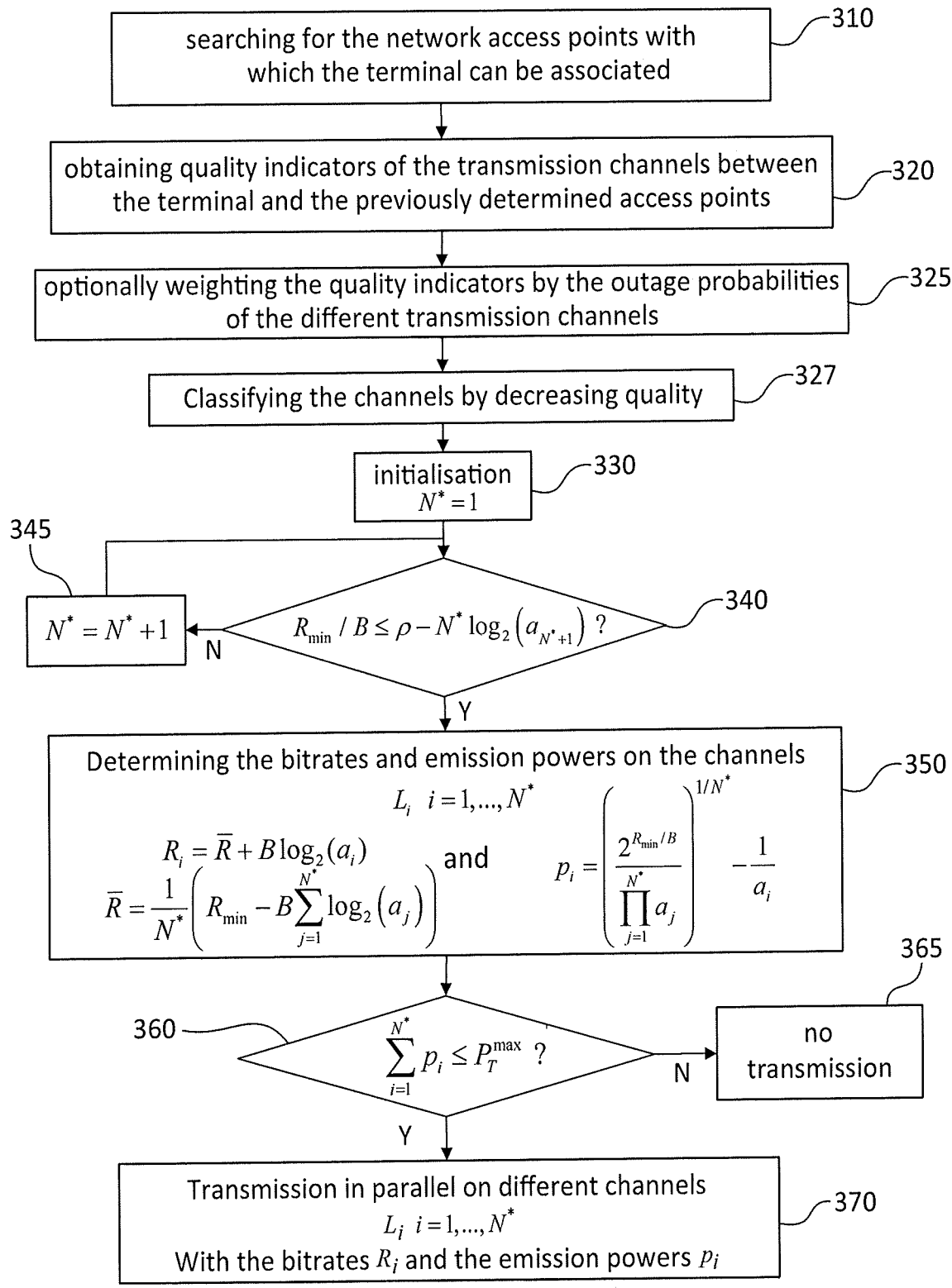
FIG. 3 shows the flowchart of a method for accessing a network by means of a multi-link, according to an embodiment of the invention.

FIG. 3 shows the flowchart of a method for accessing a network by means of a multi-link, according to one embodiment of the invention.

In a first step 310, the user terminal (UE) searches for the network access points with which it can be associated.

When the terminal UE is a mobile terminal, the list of access points may simply result from a conventional network discovery phase.

Where appropriate, the terminal may already have received the list of access points with their positions when connecting to the network for the first time. The list may have been provided by the associated access point itself or by another entity of the network. Alternatively, the terminal may have stored in memory a list of all the access point positions with their identifiers and then select those from which it receives a power signal greater than a threshold value.

According to one variant, when it is about a MEC network, the terminal can broadcast (broadcast mode) a request for supporting a computational task by the network, where appropriate with features of the task in question, such as the maximum computing latency or the computational power required. Only the access points that can respond to this support (communication channels with the terminal not suffering from a blocking situation, proximity with the terminal, link with a computing server having the required computational resources, etc.) respond then to the terminal in the form of an acknowledgement message. It should be noted that such a support request may not be systematically broadcast by the terminal: thus, if a computational task must be repeated and the mobile terminal has not moved or has slightly moved, the terminal may assume that the list of access points with which it can establish a link has not changed. According to another variant, the terminal can measure the respective levels of the received signals (RSSI) from the surrounding access points, where appropriate in several frequency bands. This RSSI vector is then transmitted to the network which can return to the terminal an estimate of its relative position vis-à-vis the surrounding access points. Alternatively, the RSSI levels can be measured from the signals received from the terminal by the various access points. The latter centralise these levels to make an estimate of the position of the terminal and transmit this estimate thereto.

When it is transmitted by the terminal, the RSSI vector can be accompanied by a request for supporting a computational task, in which case the network returns to the mobile terminal only the relative position vis-à-vis the access points capable of responding to the request in question.

Where appropriate, the access points will be able to consult a database containing a map of RSSI levels associated with lists of access points. From this base and, where appropriate, according to a criterion relating to the required computational capacity, the network will provide a list of access points capable of responding to the terminal request and the relative position of the terminal vis-à-vis these access points. The database can be constructed by means of a crowd sourcing of the terminals.

The search for the list of access points can be assisted or performed directly by a prediction tool (machine learning) trained in a supervised manner or not on the database. Yet other variants can be considered by a person skilled in the art without departing from the scope of the present invention.

In any event, the terminal has at the end of this first step a list of access points with which it is likely to be able to establish a link.

In a second step, 320, the terminal obtains quality indicators of the transmission channels with the access points determined in the previous step.

These channel quality indicators can be obtained in different ways.

First of all, when a transmission channel is a single-path transmission channel, in other words when the matrix $H_i H_i^H$ is of rank 1 where $H_i$ is the matrix of a size $N_R \times N_T$ of the transmission channel $L_i$, the quality indicator of the transmission channel can be obtained by means of:

$$a_i = \frac{|h_i|^2}{\sigma_{n,i}^2} \quad (15)$$

where $|h_i|^2$ is the unique non-zero matrix eigenvalue of the matrix $H_i H_i^H$ ($h_i$ being none other than the complex coefficient of the signal on the single path of the channel) $\sigma_{n,i}^2$ is the noise power on the channel in question.

If the channel is not a single-path channel, the path with the lowest signal power attenuation, in other words the greatest eigenvalue of the matrix $H_i H_i^H$, will be taken into consideration. The quality indicator of the transmission channel $L_i$ will be obtained by means of $$a_i = \frac{|h_i|^2}{\sigma_{n,i}^2}$$

where $|h_i|^2$ is the highest eigenvalue of $H_i H_i^H$.

The quality indicators of the transmission channels can be calculated by the access points from a channel estimate, for example by means of pilot symbols transmitted (without precoding) by the terminal. In the case of a request for supporting a computational task by a MEC network, a sequence of pilot symbols may be transmitted with the request.

Alternatively, the terminal will be able to estimate the quality indicators of the different channels from the distances separating it from the corresponding access points. The distances can be calculated by the terminal from the relative position of the latter relative to the access points, or else be directly transmitted by these access points with the acknowledgement messages to the terminal.

Thus for example, if $d_i$ is noted the distance separating the terminal and the access point $AP_i$, the quality indicator can be estimated by:

$$a_i = \frac{a}{\sigma_{n,i}^2}\left(\frac{d_i}{d_{ref}}\right)^{-\alpha} \quad (16)$$

where $d_{ref}$ is a reference distance, $\alpha$ is a positive real number depending on the type of environment of the access points and a is a dimensionless positive coefficient. Note that $a_i$ is homogeneous to the inverse of a power as in the expression (15).

Still alternatively, the quality indicators can be quantified in several levels and be stored in the database with the RSSI mapping, when this is implemented. Again, a prediction tool will be able to estimate the quality indicators quantified from the RSSI levels, after supervised training.

Other variants of obtaining these channel quality indicators can be considered by a person skilled in the art without departing from the scope of the present invention.

Step 325 is an optional step that will be implemented depending on the environment of the terminal. In particular, this step can be omitted when this environment has little risk of being disturbed during terminal communication or when the quality indicators of the transmission channels are estimated/calculated with a high frequency with regard to the duration of the stationarity of the channels.

In this step, the outage probability of the different transmission channels is evaluated. This probability depends on the environment of the access points and generally decreases according to an exponential law as the terminal approaches an access point. These outage probabilities may have been evaluated beforehand by simulation (for example according to the probability of an obstacle appearing and the statistical distribution of the size of these obstacles) and, where appropriate, updated according to the access point measurements.

The quality indicators of the transmission channels are then weighted by the respective outage probabilities of these channels:

$$\tilde{a}_i = \pi_i a_i \; i=1,\ldots,N \quad (17)$$

where $\pi_i$ is the outage probability the channel $L_i$ and $\tilde{a}_i$ its weighted quality indicator.

It will be assumed in the following description that the quality indicators are not weighted. However, it is clear that, when there is weighting, the quality indicators $a_i$ are to be replaced by their weighted equivalents, $\tilde{a}_i$.

In step 327, the transmission channels are classified by decreasing quality, in other words by decreasing values of the quality indicators $a_i$ or their weighted equivalents, $\tilde{a}_i$. Conventionally $a_{N+1} = 0^+$ (arbitrarily low positive value) is taken.

In step 330, the optimal number, $N^*$, of channels to establish a multi-link on the uplink is initialised at 1.

In step 340, it is checked from the minimum required bitrate, $R_{min}$, and from the bandwidth B, whether the condition $R_{min}/B \leq \rho - N^* \log_2(a_{N^*+1})$ is satisfied or, in an equivalent manner, whether $$2^{R_{min}/B} \leq \frac{\prod_{i=1}^{N^*} a_i}{(a_{N^*+1})^{N^*}}.$$

The minimum bitrate $R_{min}$ may be required by a service quality constraint. For example, in the case of a MEC network with a computing latency constraint, the minimum bitrate will be calculated beforehand by means of:

$$R_{min} = \frac{n_b}{(T_c - D_{rx} - w/f_s)} \quad (18)$$

where $n_b$ is the number of bits to be transferred to the network to execute the task, $T_c$ is the computing latency to be respected, w is the number of CPU cycles required for the computing delegated to the network, $f_s$ is the power of the computing server expressed in number of CPU cycles/s, and $D_{rx}$ is the time required to return the computing result to the terminal on the downlink.

According to a first variant of implementation, the terminal transmits to the network a request having as argument $n_b$ and $T_c$ (and possibly w if the network cannot determine it itself according to the nature of the task). If the network cannot complete the task in question in the time available, the access point will not transmit an acknowledgement message (or transmits a refusal message). However, if it is able to do so, it calculates the minimum bitrate $R_{min}$ on the uplink and returns it to the terminal.

According to another variant of implementation, the terminal has prior knowledge (at least approximate, even terminals of) $D_{rx}$ and $f_s$ and directly deduces therefrom the minimum bitrate $R_{min}$ on the uplink.

Other variants based on an exchange protocol between the terminal and the network could be considered without departing from the scope of the present invention.

When condition 340 is not satisfied, N* is incremented in 345 then the condition 340 is tested again. With the convention $a_{N+1}=0^+$, this condition is satisfied at the latest for N*=N.

When the condition 340 is satisfied, the bitrates $R_i$ and the powers $p_i$, on the different channels $L_i$, i=1, . . . , N* are calculated from the expressions (14-1) and (14-2).

In step 360, it is checked whether the total emission power is compatible with the maximum emission power of the terminal, in other words whether $$\sum_{i=1}^{N^*} p_i \le P_T^{max}.$$

If this is not the case, no transmission occurs, cf. 365. In the case of a MEC network for example, this will mean that the terminal will have to perform the computational task itself. Conversely, if the condition 360 is met, the terminal proceeds with a bitrate and power allocation to transmit on the N* transmission channels selected in the previous step. Finally in step 370, the terminal transmits the binary data in parallel by distributing them on the different selected transmission channels, $L_1, \ldots, L_{N^*}$, respectively with the bitrates $R_i$, and the powers, $p_i$, i=1, . . . , N*, calculated in the previous step.

In the case of an application to a MEC network, when a packet of $n_b$ bits is to be transmitted on the uplink with the bitrate $R_{min}$, the terminal distributes the $n_b$ bits on each of the transmission channels $L_i$, i=1, . . . , N*, each transmission channel transmitting a sub-packet of a size $$n_i = n_b \cdot \frac{R_i}{R_{min}}.$$

The choice of N* transmission channels, bitrates $R_i$ and powers, $p_i$ on these channels allows minimising the emission power of the terminal while complying with the service quality constraint.

The invention claimed is:

1. A method for a user terminal to access a network comprising a plurality of access points, said terminal being able to establish a multi-link on the uplink with a plurality N of such access points with a same plurality of transmission channels, characterised in that, when the terminal wishes to obtain a quality of service expressed in the form of a minimum bitrate, $R_{min}$, on the uplink, said terminal:
  obtains a channel quality indicator, $a_i$, for each transmission channel $L_i$ of said plurality, the transmission channels being indexed by decreasing quality level from their respective quality indicators;
  determines an optimal number of transmission channels, for transmitting said minimum bitrate, said optimal number being obtained as the smallest integer N*≤N satisfying $R_{min}/B \le \rho - N^* \log_2(a_{N^*+1})$, where $$\rho = \sum_{j=1}^{N^*} \log_2(a_j)$$

and selects the transmission channels $L_1, \ldots, L_{N^*}$ corresponding to this optimal number;
  for each of the transmission channels selected in the previous step, $L_i$, i=1, . . . , N*, determines a bitrate, $R_i$, with $\overline{R}+B \log_2(a_i)$ with $$\overline{R} = \frac{1}{N^*}(R_{min} - B\rho)$$

and deduces a minimum power, $p_i$ therefrom, capable of delivering the bitrate $R_i$ on this channel;
  when the sum of the minimum powers on the different channels is less than a predetermined maximum power, transmits binary data in parallel by distributing them on the different transmission channels selected $L_1, \ldots, L_{N^*}$ respectively with the bitrates $R_i$, and the powers $p_i$, i=1, . . . , N*, previously determined.

2. The method for a user terminal to access a network according to claim 1, wherein the quality indicators of the transmission channels $L_i$, i=1, . . . , N, are obtained by $$a_i = \frac{|h_i|^2}{\sigma_{n,i}^2}$$

where $|h_i|^2$ is the highest eigenvalue of $H_i H_i^H$, where $H_i$ is the matrix of the transmission channel $L_i$ and $\sigma_{n,i}^2$ is the noise power affecting the channel $L_i$.

3. The method for a user terminal to access a network according to claim 1, wherein the quality indicators of the transmission channels $L_i$, i=1, . . . , N, are obtained by $$a_i = \frac{a}{\sigma_{n,i}^2}\left(\frac{d_i}{d_{ref}}\right)^{-\alpha}$$

where $d_i$ is the distance separating the terminal from the access point on the transmission channel $L_i$, $\sigma_{n,i}^2$ is the noise power affecting the channel $L_i$, $d_{ref}$ is a reference distance, $\alpha$ is a positive real number depending on the type of environment of the access point and a is a positive coefficient.

4. The method for a user terminal access to a network according to claim 2, wherein the quality indicators of the transmission channels are weighted by the respective outage probabilities of these channels.

5. The method for a user terminal to access a network according to claim 1, wherein the terminal measures the power levels of the signals received from the access points of said plurality and transmits them to the network, and that the network determines, from these power levels, the quality indicators of the transmission channels $L_i$, i=1, . . . , N, between the terminal and the various access points.

6. The method for a user terminal to access a network according to claim 1, wherein the network is a MEC network including a computing server and that the terminal broadcasts to the network a request to execute a computational task within a maximum computing latency time $T_c$, and that the minimum bitrate, $R_{min}$, on the uplink is determined by $$R_{min} = \frac{n_b}{(T_c - D_{rx} - w/f_s)}$$

where $n_b$ is the number of bits to be transmitted by the terminal on the uplink for the execution of the computational task, w is the number of computing cycles required for the execution of the task, $f_s$ is the computing power of said server and $D_{rx}$ is the time necessary to transmit the result of the computational task to the terminal on the downlink.

7. The method for a user terminal to access a network according to claim 6, wherein only the access points that can support said execution request send an acknowledgement message to the terminal, said plurality N of access points then being constituted by those whose acknowledgement messages have been received by the terminal.

8. The method for a user terminal to access a network according to claim 6, wherein the terminal distributes the packet of $n_b$ bits to be transmitted on the uplink on each of the transmission channels $L_i$, i=1, . . . , N*, each transmission channel $L_i$ transmitting in parallel a sub-packet of a size $$n_i = n_b \cdot \frac{R_i}{R_{min}}.$$

9. The method for a user terminal to access a network according to claim 1, wherein the network is a heterogeneous network comprising macrocells and small cells, that the access points are base stations of said small cells operating in the millimetre band.

* * * * *